(12) United States Patent
Lin (10) Patent No.: US 10,972,227 B2
(45) Date of Patent: Apr. 6, 2021

(54) METHOD AND DEVICE FOR INFORMATION TRANSMISSION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/487,141

(22) PCT Filed: Feb. 22, 2017

(86) PCT No.: PCT/CN2017/074447
§ 371 (c)(1),
(2) Date: Aug. 20, 2019

(87) PCT Pub. No.: WO2018/152714
PCT Pub. Date: Aug. 30, 2018

(65) Prior Publication Data
US 2019/0386781 A1 Dec. 19, 2019

(51) Int. Cl.
*H04W 28/04* (2009.01)
*H04L 1/18* (2006.01)
(Continued)

(52) U.S. Cl.
CPC .......... *H04L 1/1812* (2013.01); *H04L 5/0055* (2013.01); *H04W 72/042* (2013.01); *H04W 72/1257* (2013.01); *H04W 88/02* (2013.01)

(58) Field of Classification Search
CPC ... H04L 1/1812; H04L 1/1887; H04L 1/1896; H04L 5/0055; H04L 1/0026;
(Continued)

(56) References Cited

U.S. PATENT DOCUMENTS 10,615,922 B2* 4/2020 Yeo .................. H04L 1/1896
2009/0046808 A1 2/2009 Varadarajan et al.
2017/0303284 A1* 10/2017 Xu .................. H04L 1/0026

FOREIGN PATENT DOCUMENTS

CN 101282192 10/2008
CN 101615986 12/2009
(Continued)

OTHER PUBLICATIONS

Interdigital Communications, "Multi-bits HARQ feedback," 3GPP TSG RAN WG1 Meeting #88, R1-1702379, 2017, 3 pages.
(Continued)

*Primary Examiner* — Phuc H Tran
(74) *Attorney, Agent, or Firm* — Hodgson Russ LLP (57) ABSTRACT

The present application provides a method and a device for transmitting information. The method includes: the terminal device determining first quantity information, wherein the first quantity information is information about a number of code block groups comprised in a transport block, and each code block group comprises at least a code block; the terminal device determining second quantity information, wherein the second quantity information is information about a total number of bits comprised in a scheduled transport block; and; the terminal device determining information about code block groups comprised in the scheduled transport block according to the first quantity information and the second quantity information.

18 Claims, 5 Drawing Sheets

100

- S110: the terminal device determines first quantity information, wherein the first quantity information is information about a number of code block groups included in a transport block, and each code block group includes at least one code block
- S120: the terminal device determines second quantity information, wherein the second quantity information is information about a total number of bits included in a scheduled transport block
- S130: the terminal device determines, according to the first quantity information and the second quantity information, information about the code block groups included in the scheduled transport block (51) Int. Cl.
*H04L 5/00* (2006.01)
*H04W 72/04* (2009.01)
*H04W 72/12* (2009.01)
*H04W 88/02* (2009.01)

(58) Field of Classification Search
CPC ... H04L 1/0057; H04L 1/0081; H04L 1/1607; H04L 1/1621; H04L 1/1692; H04L 1/1816; H04L 5/0064; H04W 72/042; H04W 72/1257; H04W 88/02; H04W 28/04; H04W 72/082
See application file for complete search history.

(56) References Cited

FOREIGN PATENT DOCUMENTS

| | | |
|---|---|---|
| CN | 101820330 | 9/2010 |
| CN | 102255712 | 11/2011 |
| CN | 104301077 | 1/2015 |
| CN | 105306166 | 2/2016 |
| CN | 105515719 | 4/2016 |
| CN | 105515733 | 4/2016 |
| CN | 105530071 | 4/2016 |
| CN | 105530072 | 4/2016 |
| RU | 2428796 | 9/2011 |

OTHER PUBLICATIONS

EPO, Office Action for EP Application No. 17897527.2, dated Feb. 5, 2020.
SIPO, First Office Action for CN Application No. 201780077870.0, dated Mar. 18, 2020.
Catt, "Short duration PUCCH structure," 3GPP TSG RAN WG1 Meeting #88bis, R1-1706159, Apr. 2017, 6 pages.
NTT Docomo, Inc., "DMRS-based vs. Sequence-based PUCCH in short duration," 3GPP TSG RAN WG1 Meeting #88, R1-1702811, Feb. 2017, 9 pages.
Samsung et al., "WF on CB or CB-group based retransmission," 3GPP TSG RAN1#88, R1-17xxxxx, Feb. 2017, 3 pages.
FSIP, Office Action for RU Application No. 2019129177-07, dated Apr. 28, 2020.
CNIPA, Second Office Action for CN Application No. 201780077870.0, dated Jul. 15, 2020.
Nokia et al., "Multi-bit Feedback for NR HARQ Operation", 3GPP TSG-RAN WG1 Meeting #88, R1-1703325, Feb. 2017, 5 pages.
Zte et al., "NR HARQ Timing and Feedback Schemes", 3GPP TSG RAN WG1 Meeting #88, R1-1701593, Feb. 2017, 8 pages.
WIPO, ISR for PCT/CN2017/074447, Nov. 16, 2017.
EPO, Communication for EP Application No. 17897527.2, dated Nov. 11, 2020.
ISDEC, Office Action for CA Application No. 3054200, dated Oct. 2, 2020.
INAPI, Office Action for CL Application No. 201902352, dated Oct. 20, 2020.
CNIPA, Decision of Rejection for CN Application No. 201780077870.0, dated Nov. 3, 2020.
IPOS, Office Action for SG Application No. 11201907728Y, dated Sep. 1, 2020.
Huawei, "A Method of Code Block Segmentation," IEEE 802.16 Broadband Wireless Access Working Group, Jul. 2008, 4 pages.
JPO, Office Action for JP Application No. 2019-545763, dated Feb. 2, 2021.

* cited by examiner

FIG. 1

| Code Block Group 1 | | | Code Block Group 2 | | | Code Block Group 3 | |
|---|---|---|---|---|---|---|---|
| CB0 | CB1 | CB2 | CB3 | CB4 | CB5 | CB6 | CB7 |

METHOD AND DEVICE FOR INFORMATION TRANSMISSION

CROSS-REFERENCE TO RELATED APPLICATION

This application is a U.S. national phase application of International Application No. PCT/CN2017/074447, filed Feb. 22, 2017, the entire disclosure of which is incorporated herein by reference.

TECHNICAL FIELD

Embodiments of the present disclosure relate to the field of communication, and in particular, to a method and a device for transmitting information.

BACKGROUND

In the current communication system, the receiving device sends Acknowledgement (ACK)/Negative Acknowledgment (NACK) feedback information to the transmitting device for different code blocks in a transport block. The transmitting device retransmits the code block that failed in decoding according to the feedback information. When a transport block includes a large number of code blocks, according to the above information feedback method, the control signaling overhead in the system is excessively large, the demodulation performance of the control signaling is reduced, and the system efficiency is reduced.

SUMMARY

The present application provides a method and a device for transmitting information.

In a first aspect, a method for transmitting information is provided, including: determining, by a terminal device, first quantity information, wherein the first quantity information is information about a number of code block groups included in a transport block, and each code block group includes at least one code block; determining, by the terminal device, second quantity information, wherein the second quantity information is information about a total number of bits included in a scheduled transport block; and determining, by the terminal device, information about code block groups included in the scheduled transport block according to the first quantity information and the second quantity information.

Based on the first aspect, in an implementation of the first aspect, the first quantity information is used to indicate a maximum number of code block groups of a transport block; or the first quantity information is used to indicate a number of the code block groups included in the scheduled transport block.

Based on the first aspect and the above implementation, in another implementation in the first aspect, the second quantity information is used to indicate a total number of bits included in the scheduled transport block; or the second quantity information is used to indicate a number of bits included in each code block group in the scheduled transport block.

Based on the first aspect and the above implementation, in another implementation in the first aspect, the information about code block groups included in the scheduled transport block is a number of the code block groups included in the scheduled transport block; or, the information about the code block groups included in the scheduled transport block is a number of the code block groups included in the scheduled transport block and a number of code blocks included in each code block group.

Based on the first aspect and the above implementation, in another implementation in the first aspect, the first quantity information is used to indicate a maximum number of code block groups of a transport block, and the information about the code block groups included in the scheduled transport block is the number of the code block groups included in the scheduled transport block; and determining, by the terminal device, information about the code block groups included in the scheduled transport block, according to the first quantity information and the second quantity information, including: determining, by the terminal device, the number of the code blocks included in the scheduled transport block according to the second quantity information; and determining, by the terminal device, the number of the code block groups included in the scheduled transport block according to the maximum number of code block groups of a transport block and the number of the code blocks included in the transport block.

Optionally, the terminal device determines a value resulted from a rounding up operation on a ration of the total number of bits included in the scheduled transport block and a maximum number of the bits of a code block group, as the number of the code blocks included in the scheduled transport block.

Based on the first aspect and the above implementation, in another implementation in the first aspect, determining, by the terminal device, the number of the code block groups included in the scheduled transport block according to the maximum number of code block groups of a transport block and the number of the code blocks included in the transport block includes: determining, by the terminal device, a smaller one of the maximum number of code block groups of a transport block and the number of the code blocks included in the scheduled transport block as the number of the code block groups included in the scheduled transport block.

Based on the first aspect and the above implementation, in another implementation in the first aspect, when the terminal device determines that the number of the code block groups included in the scheduled transport block is the maximum number of code block groups of a transport block, the method further includes: determining, by the terminal device, the number of code blocks included in each code block group according to the number of the code block groups included in the scheduled transport block and the number of code blocks included in the scheduled transport block.

Based on the first aspect and the above implementation, in another implementation in the first aspect, the information about the code block groups included in the scheduled transport block is the number of code block groups included in the scheduled transport block, and the number of code blocks included in each code block group; and determining, by the terminal device, information about code block groups included in the scheduled transport block according to the first quantity information and the second quantity information includes: when the terminal device determines that the first quantity information is used to indicate the number of code block groups included in the scheduled transport block, determining the number indicated by the first quantity information as the number of the code block groups included in the scheduled transport block; and determining, by the terminal device, the number of code blocks included in each code block group in the scheduled transport block according to the second quantity information.

Based on the first aspect and the above implementation, in another implementation in the first aspect, determining, by the terminal device, the number of code blocks included in each code block group in the scheduled transport block according to the second quantity information, includes: determining, by the terminal device, the number of code blocks included in each code block group according to the second quantity information and the maximum number of bits of a code block.

Based on the first aspect and the above implementation, in another implementation in the first aspect, when each of the code block groups includes a plurality of code blocks, each block group consists of the plurality of code blocks with consecutive indices.

Based on the first aspect and the above implementation, in another implementation in the first aspect, the terminal device supports a plurality of transmission configurations, wherein the transmission configuration includes one of the following transmission configurations: a service type configuration, a transmission time interval configuration, and a basis parameter set configuration, and the method further includes: determining, by the terminal device, a maximum number of bits of a code block according to the current transmission configuration.

Based on the first aspect and the above implementation, in another implementation in the first aspect, information carried by each code block group corresponds to one common cyclic redundancy check CRC information, and information carried by each code block included in each code block group corresponds to one proprietary CRC information.

Based on the first aspect and the above implementation, in another implementation in the first aspect, when the scheduled transport block is a transport block for downlink transmission, the method further includes: determining, by the terminal device, a code block group that failed in transmission from the code block groups included in the scheduled transport block; and determining, by the terminal device, feedback information according to the code block group failed in transmission.

Optionally, the feedback information is NACK information of a code block group for indicating a transmission failure.

Based on the first aspect and the above implementation, in another implementation in the first aspect, determining, by the terminal device, a code block group that failed in transmission from the code block groups included in the scheduled transport block includes: when the terminal device determines that there is a code block failed in decoding in a first code block group according to the proprietary CRC information corresponding to the information carried by each code block in the first code block group, determining, by the terminal device, that the first code block group is a code block group failed in transmission, wherein the first code block group is any code block group of the code block groups included in the scheduled transport block; or when the terminal device determines that the first code block group fails in the check according to the common CRC information corresponding to the information carried by the first code block group, determining, by the terminal device, that the first code block group is a code block group failed in transmission, wherein the first code block group is any code block group of the code block groups included in the scheduled transport block.

Based on the first aspect and the above implementation, in another implementation in the first aspect, when the scheduled transport block is a transport block for uplink transmission, the method further includes: receiving, by the terminal device, scheduling signaling, wherein the scheduling signaling is used to indicate a part of the code block groups included in the scheduled transport block has to be retransmitted, and retransmitting, by the terminal device, the part of the code block groups.

In a second aspect, there is provided a method for transmitting information, including: determining, by a network device, first quantity information, wherein the first quantity information is information about a number of code block groups included in a transport block, and each code block group includes at least a code block; sending, by the network device, second quantity information to the terminal device, wherein the second quantity information is information about a total number of bits included in a scheduled transport block; and determining, by the network device, information about the code block groups included in the scheduled transport block according to the first quantity information and the second quantity information.

Based on the second aspect and the above implementation, in another implementation in the second aspect, the information about the code block groups included in the scheduled transport block is a number of the code block groups included in the scheduled transport block; or, the information about the code block groups included in the scheduled transport block is the number of code block groups included in the scheduled transport block and a number of code blocks included in each code block group.

Based on the second aspect and the above implementation, in another implementation in the second aspect, the first quantity information is used to indicate a maximum number of code block groups of a transport block, and the information about the code block groups included by the scheduled transport block is the number of the code block groups included in the scheduled transport block;

wherein determining, by the network device, information about the code block groups included in the scheduled transport block according to the first quantity information and the second quantity information includes: determining, by the network device, the number of the code blocks included in the scheduled transport block according to the second quantity information; and determining, by the network device, the number of the code block groups included in the scheduled transport block according to the maximum number of code block groups of a transport block and the number of the code blocks included in the transport block.

Based on the second aspect and the above implementation, in another implementation in the second aspect, determining, by the network device, the number of the code block groups included in the scheduled transport block according to the maximum number of code block groups of a transport block and the number of the code blocks included in the transport block, includes: determining, by the network device, a smaller value of the maximum number of code block groups of a transport block and the number of the code blocks included in the transport block as the number of the code block groups included in the scheduled transport block.

Based on the second aspect and the above implementation, in another implementation in the second aspect, when the scheduled transport block is a transport block for downlink transmission, the method further includes: receiving, by the network device, feedback information sent by the terminal device; and determining, by the network device, a code block group failed in transmission from the code block groups included in the scheduled transport block according to the feedback information.

Based on the second aspect and the above implementation, in another implementation in the second aspect, when the scheduled transport block is a transport block for uplink transmission, the method further includes: sending, by the network device, scheduling signaling, wherein the scheduling signaling is used to indicate that a part of the code block groups included in the scheduled transport block has to be retransmitted.

In a third aspect, a terminal device is provided for performing the method in the first aspect or any possible implementations of the first aspect. In particular, the terminal device includes functional modules for performing the method in the first aspect or any possible implementations of the first aspect.

In a fourth aspect, a network device is provided for performing the method in the second aspect or any possible implementations of the second aspect. In particular, the network device includes functional modules for performing the method in the second aspect or any possible implementations of the second aspect.

In a fifth aspect, a terminal device is provided, including a processor, a memory, and a transceiver. The processor, the memory, and the transceiver communicate with each other through an internal connection path, for transmitting control and/or data signals, such that the terminal device performs the method in the first aspect or any possible implementations of the first aspect.

In a sixth aspect, a network device is provided, including a processor, a memory, and a transceiver. The processor, the memory, and the transceiver communicate with each other through an internal connection path, for transmitting control and/or data signals, such that the network device performs the method in the second aspect or any possible implementations of the second aspect.

In a seventh aspect, a computer readable medium is provided for storing a computer program, the computer program including instructions for performing the method in the first aspect or any possible implementations of the first aspect.

In an eighth aspect, a computer readable medium is provided for storing a computer program, the computer program including instructions for performing the method in the second aspect or any possible implementations of the second aspect.

DETAILED DESCRIPTION

The technical solutions in the embodiments of the present application will be clearly and completely described in the following with reference to the accompanying drawings in the embodiments.

It should be understood that the technical solutions of the embodiments of the present application can be applied to various communication systems, such as a Global System of Mobile communication (GSM) system, a Code Division Multiple Access (CDMA) system, and a Wideband Code Division Multiple Access (WCDMA) system, a General Packet Radio Service (GPRS), a Long Term Evolution (LTE) system, a LTE Frequency Division Duplex (FDD) System, a LTE Time Division Duplex (TDD), a Universal Mobile Telecommunication System (UMTS) or a Worldwide Interoperability for Microwave Access (WiMAX) communication system, a 5G system, or a new Wireless (NR) system.

In the embodiments of the present application, the terminal device may include, but is not limited to, a mobile station (MS), a mobile terminal, a mobile telephone, a user equipment (UE), a handset and a portable device, a vehicle, etc. The terminal device can communicate with one or more core networks via a Radio Access Network (RAN). For example, the terminal device can be a mobile phone (or Known as a "cellular" telephone), a computer with wireless communication capabilities, etc. The terminal devices can also be a portable, pocket-sized, handheld, computer-integrated or in-vehicle mobile device.

The network device involved in the embodiments of the present application is a device deployed in a radio access network to provide a wireless communication function for a terminal device. The network device may be a base station, and the base station may include various forms of a macro base station, a micro base station, a relay station, an access point, and the like. In systems with different radio access technologies, the names of devices with base station functionality may vary. For example, in an LTE network, it is called an Evolved NodeB (eNB or eNodeB), and in a 3rd Generation (3G) network, it is called a Node B, and so on.

It should be noted that, in the embodiments of the present application, the uplink transmission refers to a process in which the terminal device sends information to the network device, and the downlink transmission refers to a process in which the network device sends information to the terminal device.

Figure 1:
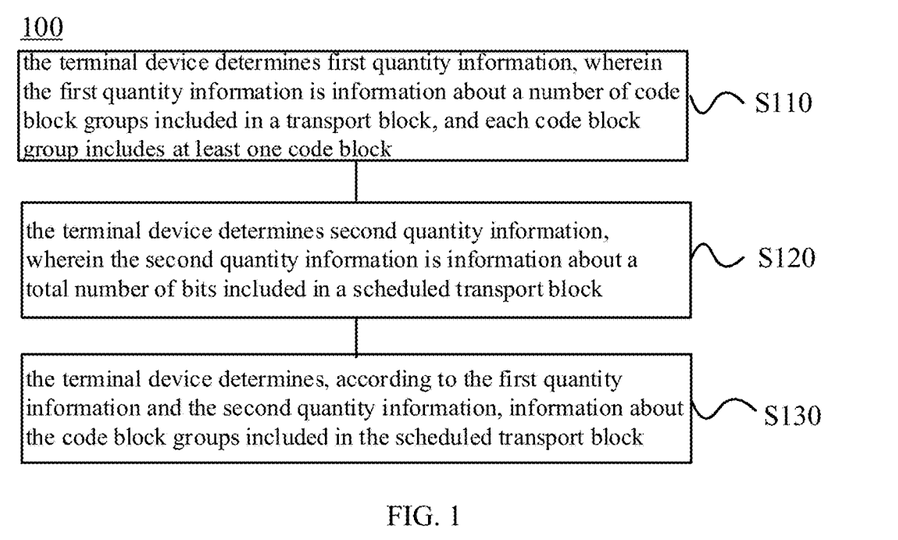
FIG. 1 is a schematic flowchart of a method for transmitting information according to an embodiment of the present application.

FIG. 1 illustrates a method for transmitting information according to an embodiment of the present application. As shown in FIG. 1, the method 100 includes the following steps.

In S110, the terminal device determines first quantity information, wherein the first quantity information is information about a number of code block groups included in a transport block, and each code block group includes at least one code block.

In S120, the terminal device determines second quantity information, wherein the second quantity information is information about a total number of bits included in a scheduled transport block.

In S130, the terminal device determines, according to the first quantity information and the second quantity information, information about the code block groups included in the scheduled transport block.

According to the method for transmitting information according to an embodiment of the present application, the terminal device determines information about the code block groups included in the scheduled transport block, according to information about a number of code block groups included in a transport block, and information about a total number of bits included in a scheduled transport block. Thereby, the terminal device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

Optionally, in S110, the first quantity information is used to indicate a maximum number of code block groups of a transport block. Or it can be understood that the first quantity information is used to indicate a maximum number of code block groups that a transport block can be divided into. In this case, the terminal device can receive high layer signaling sent by the network device, and determine the first quantity information according to the high layer signaling. Or the maximum number of code block groups of a transport block can be previously agreed in the protocol.

Alternatively, in S110, the first quantity information is used to indicate the number of the code block groups included in the scheduled transport block. Or it can be understood that the first quantity information is used to indicate the number of code block groups that the scheduled transport block is divided into. In this case, the terminal device can receive downlink control signaling sent by the network device, and determine the first quantity information according to the downlink control signaling.

Optionally, in S120, the second quantity information is used to indicate the total number of bits included in the scheduled transport block, or the second quantity information is used to indicate the number of bits included in each code block group in the scheduled transport block. In this case, the terminal device can receive signaling sent by the network device, and determine the second amount of information according to the received signaling.

Optionally, in S130, the information about the code block groups included in the scheduled transport block is the number of the code block groups included in the scheduled transport block. Or the information about the code block groups included in the scheduled transport block is the number of the code block groups included in the scheduled transport block and the number of the code blocks included in each code block group.

Optionally, in some embodiments, the terminal device determines, according to formula (1), the number N of code block groups included in the scheduled transport block, $$N = \min(A, N_{num\_CB}) \quad (1).$$

Where min( ) represents an operation of taking a smaller value, A represents the maximum number of code block groups of a transport block, and $N_{num\_CB}$ represents the number of code blocks included in the scheduled transport block. The value of $N_{num\_CB}$ can be indicated by the network device to the terminal device through signaling, and the value of $N_{num\_CB}$ can also be determined by the terminal device according to the second quantity information.

For example, assuming that the maximum number of code block groups of a transport block is 10, and the number of code blocks that the scheduled transport block includes is 30, the terminal device determines the number of the code block groups included in the scheduled transport block is 10. Assuming that the maximum number of code block groups of a transport block is 10, and the number of code blocks that the scheduled transport block includes is 8, the terminal device determines that the number of code block groups included in the scheduled transport block is 8.

Optionally, in some embodiments, the terminal device determines, according to the second quantity information, the number of code blocks that the scheduled transport block includes, and can be the number of code blocks included in the scheduled transport block determined by the terminal device according to formula (2), $$N_{num\_CB} = \left\lceil \frac{N_{TBS}}{N_{CB\_max}} \right\rceil \quad (2)$$

Wherein, ⌈ ⌉ represents an up-rounding operation, $N_{TBS}$ represents the total number of bits included in the scheduled transport block, and $N_{CB\_max}$ represents the maximum number of bits of a code block.

It can be understood that the value of $N_{CB\_max}$ in the formula (2) can be agreed in the protocol or configured by the network device. Moreover, when the terminal device supports multiple transmission configurations at the same time, the values of $N_{CB\_max}$ in different transmission configurations are different. Therefore, the terminal device needs to determine the value of $N_{CB\_max}$ according to the current transmission configuration. For example, the terminal device supports different service types (for example, Enhanced Mobile Broadband (eMBB), Ultra Reliable & Low Latency Communication (URLLC), and the different service types correspond to different values of $N_{CB\_max}$. Alternatively or additionally, the terminal device supports multiple transmission time intervals (for example, a slot, a mini-slot), and different transmission time intervals correspond to different values of $N_{CB\_max}$. Alternatively or additionally, the terminal device supports multiple basic parameter set (Numerology), the different basic parameter sets correspond to different values of $N_{CB\_max}$.

Further, when $N < N_{CB\_max}$, or when the number of code block groups included in the scheduled transport block is the maximum number of code block groups of a transport block, the terminal device can determine the number of code blocks included in each code block group, according to the number N of code block groups included in the scheduled transport block and the number of code blocks included in the scheduled transport block.

Optionally, in some embodiments, the terminal device can determine that $$\left(N_{num\_CB} - N \cdot \left\lfloor \frac{N_{num\_CB}}{N} \right\rfloor\right)$$

code block groups in the N code block groups included in the scheduled transport block each includes $$\left\lceil \frac{N_{num\_CB}}{N} \right\rceil$$

code blocks, and each of the remaining code block groups includes $$\left\lfloor \frac{N_{num\_CB}}{N} \right\rfloor$$

code blocks.

Alternatively, the terminal device can determine that $$\left(N \cdot \left\lfloor \frac{N_{num\_CB}}{N} \right\rfloor - N_{num\_CB}\right)$$

code block groups in the N code block groups included in the scheduled transport block includes $$\left\lfloor \frac{N_{num\_CB}}{N} \right\rfloor$$

code blocks, and each of the remaining code block groups includes $$\left\lceil \frac{N_{num\_CB}}{N} \right\rceil$$

code blocks.

For example, if it is assumed that N=3 and $N_{num\_CB}$=8, the terminal device determines that two code block groups in the three code block groups each contains three code blocks, and a code block group includes two code blocks.

Also, it can be understood that when the number of code block groups included in the scheduled transport block is the number of code blocks included in the scheduled transport block, each code block group includes one code block.

In the embodiment of the present application, optionally, the terminal device determines, according to the first quantity information and the second quantity information, the number of code block groups included in the scheduled transport block and the number of code blocks included in each code block group. When the first quantity information is used to indicate the number of code block groups included in the scheduled transport block, the terminal device determines the number indicated by the first quantity information as the number of code block groups included in the scheduled transport block. Further, the terminal device determines, according to the second quantity information, the number of code blocks included in each code block group in the scheduled transport block.

Optionally, as an example, the number of code blocks included in each $$\text{code block group} = \left\lceil \frac{N_{TBS}}{N_{CB\_max}} \right\rceil,$$

in this case, $N_{TBS}$ represents the number of bits included in each code block group.

Figure 2:
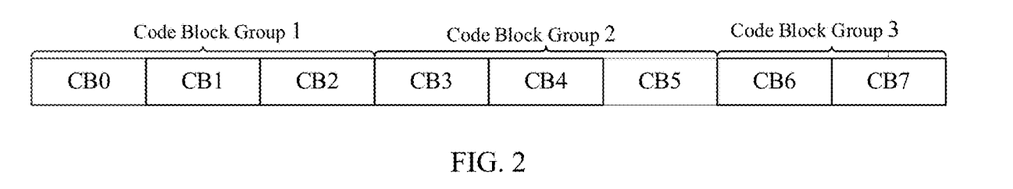
FIG. 2 is a schematic diagram of a code block group according to an embodiment of the present application.

In all the above embodiments, optionally, when the code block groups included in the scheduled transport block includes a plurality of code blocks, each block group consists of the plurality of code blocks with consecutive indices. As shown in FIG. 2, the scheduled transport block includes three code block groups, namely, a code block group 1, a code block group 2, and a code block group 3, wherein the code block group 1 includes code blocks with indices CB0, CB1 and CB2, the code block group 2 includes code blocks with indices CB3, CB4 and CB5, and the code block group 3 includes code blocks with indices CB5, CB6 and CB7.

Figure 3:
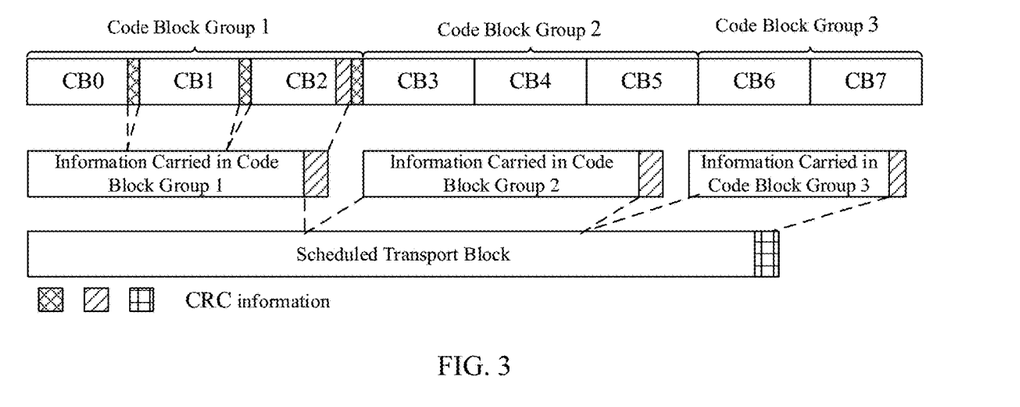
FIG. 3 is another schematic diagram of a code block group according to an embodiment of the present application.
Figure 4:
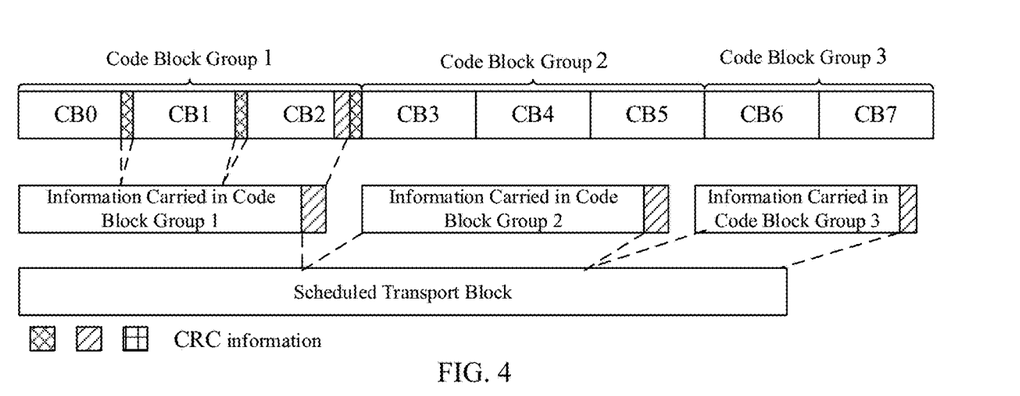
FIG. 4 is still another schematic diagram of a code block group according to an embodiment of the present application.

Further, as shown in FIG. 3 and FIG. 4, information carried by each code block group corresponds to one Common Cyclic Redundancy Check (CRC) information, and information carried in each code block included in each code block group corresponds to one proprietary CRC information.

In the embodiment of the present application, optionally, when the scheduled transport block is a transport block of the downlink transmission, the terminal device determines a code block group failed in transmission from the code block groups included in the scheduled transport block, and then the terminal device determines feedback information according to the code block group failed in transmission.

Optionally, the feedback information can be NACK information indicating a code block group failed in transmission. When the network device receives the NACK information, the network device can directly determine the code block group failed in transmission according to the NACK information.

Alternatively, the feedback information can also be ACK information for indicating a properly transmitted code block group, and the network device directly determines the properly transmitted code block group according to the ACK information, thereby determining the code block group failed in transmission.

Alternatively, the feedback information includes both ACK information and NACK information, and the network device directly determines the code block group failed in transmission according to the NACK information.

Thereby, the terminal device performs feedback for the code block group, which can reduce the control signaling overhead, improve the demodulation performance of the control signaling, and improve the system efficiency, compared to the method for performing feedback for each code block.

Specifically, in some embodiments, the terminal device can determine the code block group failed in transmission of the code block groups included in the scheduled transport block in the following two manners.

In a first manner, the terminal device decodes all the code blocks in a code block group according to the proprietary CRC information corresponding to the information carried by each code block. If there is a code block failed in decoding in the code block group, the terminal device confirms that this code block group is a code block group failed in transmission.

In the second manner, the terminal device checks a code block group according to the common CRC information corresponding to the information carried by the code block group. If the code block group fails in the check, the terminal device confirms that the code block group is the code block group failed in transmission.

In the embodiment of the present application, optionally, when the scheduled transport block is a transport block of uplink transmission, the terminal device receives scheduling information, where the scheduling signaling is used to indicate that a part of the code block groups included in the scheduled transport block has to be retransmitted. Then, the terminal device retransmits the part of the code block groups. Therefore, the terminal device only needs to retransmit the code block groups indicated by the scheduling signaling for retransmission, which can improve system efficiency.

The method for transmitting information according to the embodiment of the present application is described in detail above from the terminal device side with reference to FIG. 1 to FIG. 4. The method for transmitting information according to the embodiment of the present application will be described in detail below from the network device side with reference to FIG. 5. It should be understood that the interaction between the network device and the terminal device described from the network device side is the same as that described from the terminal device side. To avoid repetition, the related description is omitted as appropriate.

Figure 5:
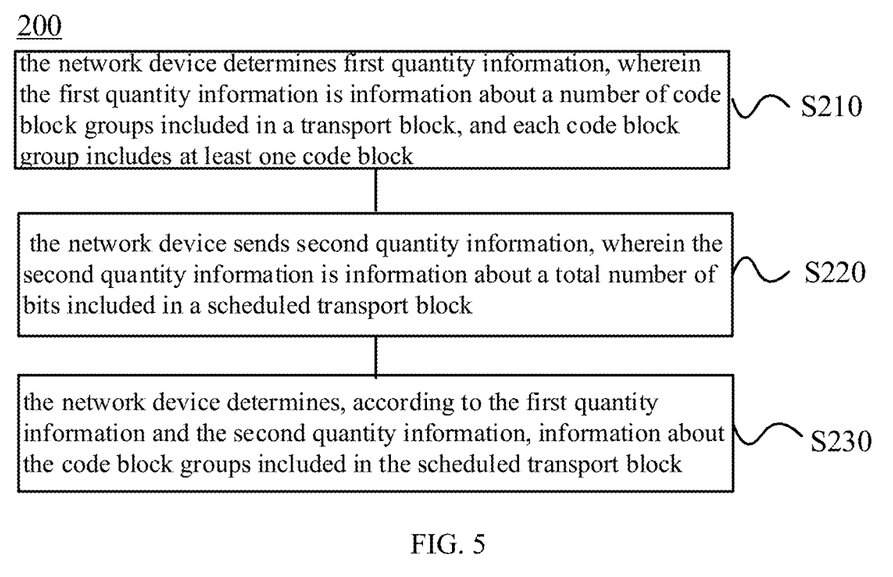
FIG. 5 is a schematic flowchart of a method for transmitting information according to another embodiment of the present application.

FIG. 5 illustrates a method for transmitting information according to another embodiment of the present application. As shown in FIG. 5, the method 200 includes the following steps.

In S210, the network device determines first quantity information, wherein the first quantity information is information about a number of code block groups included in a transport block, and each code block group includes at least one code block.

In S220, the network device sends second quantity information, wherein the second quantity information is information about a total number of bits included in a scheduled transport block.

In S230, the network device determines, according to the first quantity information and the second quantity information, information about the code block groups included in the scheduled transport block.

In the method for transmitting information according to the present application, the network device determines information about the code block groups included in the scheduled transport block, according to information about a number of code block groups included in a transport block, and information about a total number of bits included in a scheduled transport block. And the network device sends second quantity information to the terminal device, such that the terminal device can determine information about the code block groups included in the scheduled transport block according to the determined first quantity information and the received second quantity information. Thereby, the terminal device or the network device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

In the embodiment of the present application, optionally, the information about the code block groups included in the scheduled transport block is the number of the code block groups included in the scheduled transport block; or
the information about the code block groups included in the scheduled transport block is the number of code block groups included in the scheduled transport block and the number of code blocks included in each code block group.

In the embodiment of the present application, optionally, the first quantity information is used to indicate a maximum number of code block groups of a transport block, and the information about the code block groups included by the scheduled transport block is the number of the code block groups included in the scheduled transport block.

Specifically, in S230, the network device determines, according to the second quantity information, a number of the code blocks included in the scheduled transport block; and the network device determines the number of the code block groups included in the scheduled transport block according to the maximum number of code block groups of a transport block and the number of the code blocks included in the transport block.

In the embodiment of the present application, optionally, the network device determining the number of the code block groups included in the scheduled transport block according to the maximum number of code block groups of a transport block and the number of the code blocks included in the transport block, includes: the network device determining a smaller value of the maximum number of code block groups of a transport block and the number of the code blocks included in the transport block as the number of the code block groups included in the scheduled transport block.

In the embodiment of the present application, optionally, when the scheduled transport block is a transport block for downlink transmission, the method 200 further includes: the network device receiving feedback information sent by the terminal device; the network device determining, according to the feedback information, a code block group failed in transmission from the code block groups included in the scheduled transport block.

In the embodiment of the present application, optionally, when the scheduled transport block is a transport block for uplink transmission, the method 200 further includes: the network device sending scheduling signaling, wherein the scheduling signaling is used to indicate that a part of the code block groups included in the scheduled transport block has to be retransmitted.

Figure 6:
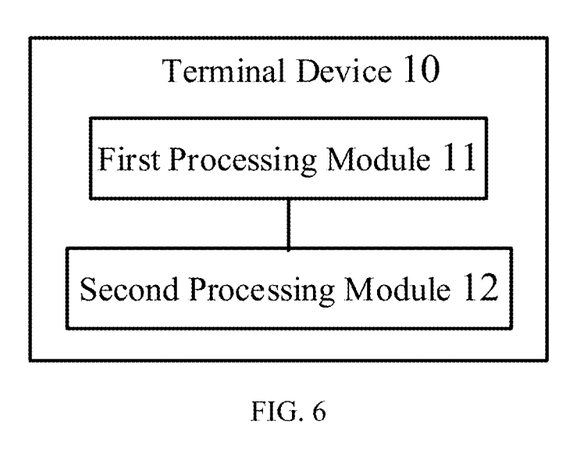
FIG. 6 is a schematic block diagram of a terminal device according to an embodiment of the present application.

The method for transmitting information according to the embodiment of the present application is described in detail with reference to FIG. 1 to FIG. 5. The terminal device according to the embodiment of the present application is described in detail below with reference to FIG. 6. As shown in FIG. 6, the terminal device 10 includes:

a first processing module 11 configured to determines first quantity information, wherein the first quantity information is information about a number of code block groups included in a transport block, and each code block group includes at least one code block;

the first processing module 11 is further configured to determine second quantity information, wherein the second quantity information is information about a total number of bits included in a scheduled transport block; and a second processing module 12 configured to determine, according to the first quantity information and the second quantity information, information about the code block groups included in the scheduled transport block.

Therefore, the terminal device according to the embodiment of the present application determines information about the code block groups included in the scheduled transport block, according to information about the number of code block groups included in a transport block, and information about the total number of bits included in the scheduled transport block. Thereby, the terminal device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

In the embodiment of the present application, optionally, the first quantity information is used to indicate a maximum number of code block groups of a transport block; or the first quantity information is used to indicate the number of the code block groups included in the scheduled transport block.

In the embodiment of the present application, optionally, the second quantity information is used to indicate a total number of bits included in the scheduled transport block; or the second quantity information is used to indicate the number of bits included in each code block group in the scheduled transport block.

In the embodiment of the present application, optionally, the information about the code block groups included in the scheduled transport block is the number of the code block groups included in the scheduled transport block; or the information about the code block groups included in the scheduled transport block is the number of the code block groups included in the scheduled transport block and the number of code blocks included in each code block group.

In the embodiment of the present application, optionally, the first quantity information is used to indicate a maximum number of code block groups of a transport block, and the information about the code block groups included in the scheduled transport block is the number of the code block groups included in the scheduled transport block.

The second processing module 12 is specifically configured to determine the number of code blocks included in the scheduled transport block according to the second quantity information; and determine the number of code block groups included in the scheduled transport block according to the maximum number of code block groups of a transport block and the number of code blocks included in the transport block.

In the embodiment of the present application, optionally, the second processing module 12 is specifically configured to determine the smaller one of the maximum number of code block groups of a transport block and the number of the code blocks included in the scheduled transport block as the number of the code block groups included in the scheduled transport block.

In the embodiment of the present application, optionally, when the second processing module determines that the number of the code block groups included in the scheduled transport block is the maximum number of code block groups of a transport block, the second processing module 12 is further configured to: determine the number of code blocks included in each code block group, according to the number of code block groups included in the scheduled transport block, and the number of code blocks included in the scheduled transport block.

In the embodiment of the present application, optionally, the information about the code block groups included in the scheduled transport block is the number of code block groups included in the scheduled transport block, and the number of code blocks included in each code block group.

The second processing module 12 is specifically configured to, when the first quantity information is used to indicate the number of code block groups included in the scheduled transport block, determine the number indicated by the first quantity information as the number of code block groups included in the scheduled transport block; and determine the number of code blocks included in each code block group in the scheduled transport block according to the second quantity information.

In the embodiment of the present application, optionally, the second processing module 12 is specifically configured to determine the number of code blocks included in each code block group according to the second quantity information and the maximum number of bits of a code block.

In the embodiment of the present application, optionally, when each of the code block groups includes a plurality of code blocks, each block group consists of the plurality of code blocks with consecutive indices.

In the embodiment of the present application, optionally, the terminal device supports multiple transmission configurations, wherein the transmission configurations include one of the following transmission configurations: a service type configuration, a transmission time interval configuration, and a basic parameter set configuration. The second processing module 12 is further configured to: determine, according to the current transmission configuration, a maximum number of bits of a code block.

In the embodiment of the present application, optionally, information carried by each code block group corresponds to one common cyclic redundancy check CRC information, and information carried by each code block included in each code block group corresponds to one proprietary CRC information.

In the embodiment of the present application, optionally, when the scheduled transport block is a transport block for downlink transmission, the second processing module 12 is further configured to: determine a code block group failed in transmission from the code block groups included in the scheduled transport block; and determine feedback information according to the code block group failed in transmission.

In the embodiment of the present application, the second processing module 12 is specifically configured to, when determining that there is a code block failed in decoding in a first code block group according to the proprietary CRC information corresponding to the information carried by each code block in the first code block group, determine that the first code block group is a code block group failed in transmission, wherein the first code block group is any code block group of the code block groups included in the scheduled transport block; or when determining the first code block group fails in the check according to the common CRC information corresponding to the information carried by the first code block group, determine that the first code block group is a code block group failed in transmission, wherein the first code block group is any code block group of the code block groups included in the scheduled transport block.

Figure 7:
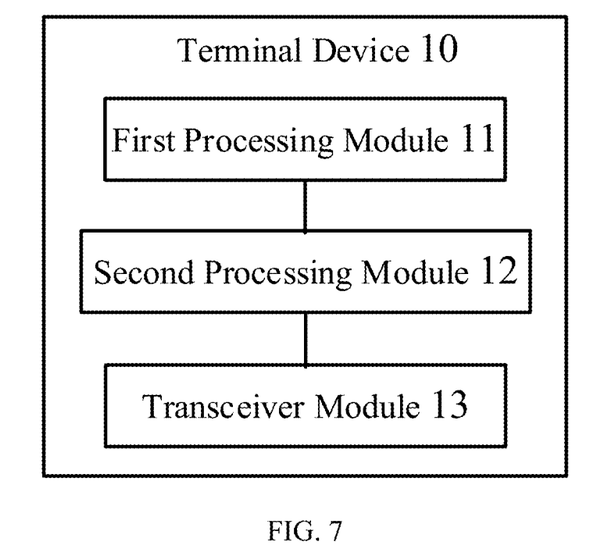
FIG. 7 is another schematic block diagram of a terminal device according to an embodiment of the present application.

In the embodiment of the present application, optionally, as shown in FIG. 7, the terminal device further includes a transceiver module 13. When the scheduled transport block is a transport block for uplink transmission, the transceiver module 13 is configured to receive scheduling signaling, wherein the scheduling signaling is used to indicate a part of the code block groups included in the scheduled transport block has to be retransmitted, and retransmit the part of the code block groups.

The terminal device according to the embodiment of the present application can refer to the process of the method 100 corresponding to the embodiment of the present application, and the respective units/modules in the terminal device and the other operations and/or functions described above respectively implement the corresponding processes in the method 100. For the sake of brevity, it will not be repeated here.

Figure 8:
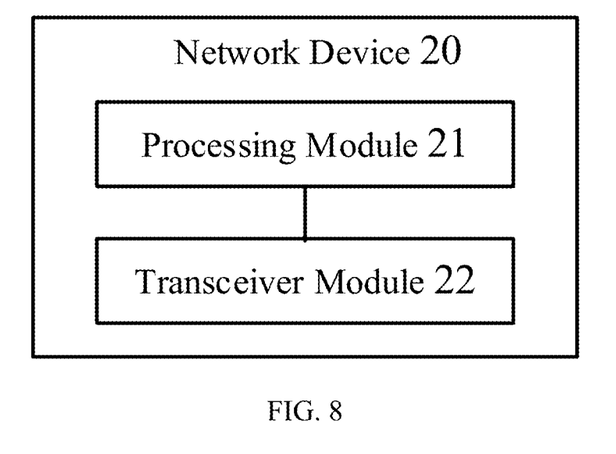
FIG. 8 is a schematic block diagram of a network device according to an embodiment of the present application.

FIG. 8 shows a network device according to an embodiment of the present application. As shown in FIG. 8, the network device 20 includes:

a processing module 21 configured to determine first quantity information, wherein the first quantity information is information about a number of code block groups included in a transport block, and each code block group includes at least one code block;

a transceiver module 22 configured to send second quantity information to the terminal device, wherein the second quantity information is information about a total number of bits included in a scheduled transport block; and the processing module 21 is further configured to determine, according to the first quantity information and the second quantity information, information about the code block groups included in the scheduled transport block.

Therefore, the network device according to the embodiment of the present application determines information about the code block groups included in the scheduled transport block, according to information about a number of code block groups included in a transport block, and information about a total number of bits included in a scheduled transport block. And the network device sends second quantity information to the terminal device, such that the terminal device can determine information about the code block groups included in the scheduled transport block according to the determined first quantity information and the received second quantity information. Thereby, the terminal device or the network device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

In the embodiment of the present application, optionally, the information about the code block groups included in the scheduled transport block is the number of code block groups included in the scheduled transport block; or the information about the code block groups included in the scheduled transport block is the number of code block groups included in the scheduled transport block and the number of code blocks included in each code block group.

In the embodiment of the present application, optionally, the first quantity information is used to indicate a maximum number of code block groups of a transport block, and the information about the code block groups included by the scheduled transport block is the number of the code block groups included in the scheduled transport block.

The processing module 21 is specifically configured to determine, according to the second quantity information, a number of the code blocks included in the scheduled transport block; and determine the number of the code block groups included in the scheduled transport block according to the maximum number of code block groups of a transport block and the number of the code blocks included in the transport block.

In the embodiment of the present application, the processing module 21 is specifically configured to determine a smaller value of the maximum number of code block groups of a transport block and the number of the code blocks included in the transport block as the number of the code block groups included in the scheduled transport block.

In the embodiment of the present application, optionally, when the scheduled transport block is a transport block for downlink transmission, the transceiver module 22 is further configured to receive feedback information sent by the terminal device;

the processing module 21 is further configured to determine, according to the feedback information, a code block group failed in transmission from the code block groups included in the scheduled transport block.

In the embodiment of the present application, optionally, when the scheduled transport block is a transport block for uplink transmission, the transceiver module 22 is further configured to send scheduling signaling, wherein the scheduling signaling is used to indicate that a part of the code block groups included in the scheduled transport block has to be retransmitted.

The network device according to the embodiment of the present application can refer to the process of the method 200 corresponding to the embodiment of the present application, and the respective units/modules in the network device and the other operations and/or functions described above respectively implement the corresponding processes in the method 200. For the sake of brevity, it will not be repeated here.

Figure 9:
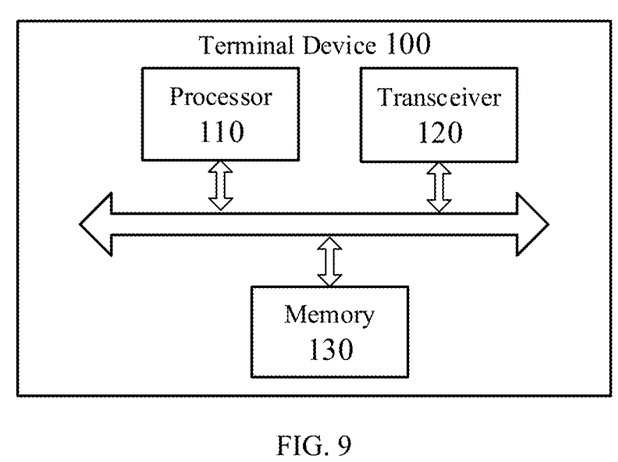
FIG. 9 is a schematic block diagram of a terminal device according to another embodiment of the present application.

FIG. 9 shows a terminal device according to another embodiment of the present application. As shown in FIG. 9, the terminal device 100 includes a processor 110 and a transceiver 120. The processor 110 is connected to the transceiver 120. Optionally, the network device 100 further includes a memory 130. The memory 130 is connected to the processor 110. The processor 110, the memory 130, and the transceiver 120 can communicate with each other through an internal connection path. The processor 110 is configured to determine first quantity information, wherein the first quantity information is information about a number of code block groups included in a transport block, and each code block group includes at least one code block; determine second quantity information, wherein the second quantity information is information about a total number of bits included in a scheduled transport block; and determine, according to the first quantity information and the second quantity information, information about the code block groups included in the scheduled transport block.

Therefore, the terminal device according to the embodiment of the present application determines information about the code block groups included in the scheduled transport block, according to information about the number of code block groups included in a transport block, and information about the total number of bits included in the scheduled transport block. Thereby, the terminal device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

The terminal device 100 according to the embodiment of the present application can refer to the terminal device 10 corresponding to the embodiment of the present application, and each unit/module in the terminal device and the other operations and/or functions respectively implement the corresponding processes in the method 100. For the sake of brevity, it will not be repeated here.

Figure 10:
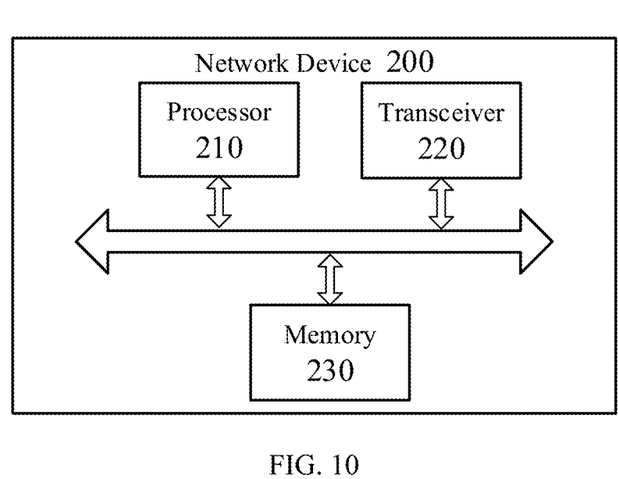
FIG. 10 is a schematic block diagram of a network device according to another embodiment of the present application.

FIG. 10 is a schematic block diagram of a network device according to another embodiment of the present application. As shown in FIG. 10, the network device 200 includes: a processor 210 and a transceiver 220. The processor 210 is connected to the transceiver 220. Optionally, the terminal device 200 further includes a memory 230, and the memory 230 is connected to the processor 210. The processor 210, the memory 230, and the transceiver 220 can communicate with each other through an internal connection path. The processor 210 is configured to determine first quantity information, wherein the first quantity information is information about a number of code block groups included in a transport block, and each code block group includes at least one code block. The transceiver 220 is configured to second quantity information to the terminal device, wherein the second quantity information is information about a total number of bits included in a scheduled transport block. The processor 210 is further configured to determine, according to the first quantity information and the second quantity information, information about the code block groups included in the scheduled transport block.

Therefore, the network device according to the embodiment of the present application determines information about the code block groups included in the scheduled transport block, according to information about a number of code block groups included in a transport block, and information about a total number of bits included in a scheduled transport block. And the network device sends second quantity information to the terminal device, such that the terminal device can determine information about the code block groups included in the scheduled transport block according to the determined first quantity information and the received second quantity information. Thereby, the terminal device or the network device can determine the number of the code block groups included in the scheduled transport block according to the information about the code block groups included in the scheduled transport block. Then, when feedback is performed for the code block groups, an appropriate amount of feedback information can be determined according to the number of the code block groups. The control signaling overhead can be reduced, the demodulation performance of the control signaling can be improved, and the system efficiency can be improved.

The network device 200 according to the embodiment of the present application can refer to the network device 20 corresponding to the embodiment of the present application, and the respective units/modules in the network device and the other operations and/or functions respectively implement the corresponding processes in the method 200. For the sake of brevity, it will not be repeated here.

It can be understood that the processor in the embodiment of the present application can be an integrated circuit chip with signal processing capability. The processor can be a general-purpose processor, a digital signal processor (DSP), an application specific integrated circuit (ASIC), a Field Programmable Gate Array (FPGA), or other programmable logic devices, discrete gates or transistor logic devices, discrete hardware components. The methods, steps, and logical block diagrams disclosed in the embodiments of the present application can be implemented or executed. The general purpose processor can be a microprocessor or the processor or any conventional processor or the like.

The memory in the embodiments of the present application can be a volatile memory or a non-volatile memory, or can include both volatile and non-volatile memory. The non-volatile memory can be a read-only memory (ROM), a programmable read only memory (PROM), an erasable programmable read only memory (Erasable PROM, EPROM), or an electrically erasable programmable read only memory (EEPROM) or a flash memory. The volatile memory can be a Random Access Memory (RAM) that acts as an external cache. By way of example and not limitation, many forms of RAM are available, such as a static random access memory (SRAM), a dynamic random access memory (DRAM), a synchronous dynamic random access memory (Synchronous DRAM, SDRAM), a Double Data Rate SDRAM (DDR SDRAM), an Enhanced Synchronous Dynamic Random Access Memory (ESDRAM), a Sync Link Dynamic Random Access Memory (Synchlink DRAM, SLDRAM) and a direct rambus random access memory (DR RAM). It should be noted that the memories of the systems and methods described herein are intended to include, without being limited to, these and any other suitable types of memories.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the devices and the units described above can refer to the corresponding processes in the foregoing method embodiments, and details are not described herein again.

In the several embodiments provided by the present application, it should be understood that the disclosed systems, devices, and methods can be implemented in other manners. For example, the device embodiments described above are merely illustrative. For example, the division of the unit is only a logical function division. In actual implementation, there can be another division manner, for example, multiple units or components can be combined or can be integrated into another system, or some features can be ignored or skipped. In addition, the mutual coupling or direct coupling or communication connection shown or discussed can be an indirect coupling or communication connection through some interfaces, devices or units, and can be in an electrical, mechanical or other form.

The units described as separate components can or cannot be physically separated, and the components displayed as units can or cannot be physical units, that is, can be located in one place, or can be distributed to multiple network units. Some or all of the units can be selected according to actual needs to achieve the objective of the solution of the embodiment.

In addition, each functional unit in each embodiment of the present application can be integrated into one processing unit, or each unit can exist physically separately, or two or more units can be integrated into one unit.

The functions can be stored in a computer readable storage medium if implemented in the form of a software functional unit and sold or used as a standalone product. Based on such understanding, the technical solution of the present application, in its essence or with the part contributing to the prior art, or a part of the technical solution, can be embodied in the form of a software product, which is stored in a storage medium, including instructions used to cause a computer device (which can be a personal computer, a server, or a network device, etc.) to perform all or part of the steps of the methods described in various embodiments of the present application. The storage medium includes: a U disk, a mobile hard disk, a read-only memory (ROM), a random access memory (RAM), a magnetic disk, or an optical disk, and various media that can store program codes.

The foregoing is only a specific embodiment of the present application, but the scope of protection of the present application is not limited thereto, and any person skilled in the art can easily think of modifications or substitutions within the technical scope disclosed in the present application. Such modifications or substitutions should be covered by the scope of protection of this application. Therefore, the scope of protection of the present application should be subject to the protection scope of the claims.

What is claimed is:

1. A method for transmitting information, comprising:
    determining, by a terminal device, first quantity information, wherein the first quantity information is information about a number of code block groups comprised in a transport block, and each code block group comprises at least one code block; and
    determining, by the terminal device, information about code block groups comprised in a currently scheduled transport block according to the first quantity information and a second quantity information, wherein the second quantity information is information about a total number of bits comprised in the currently scheduled transport block;
    wherein the first quantity information is used to indicate a maximum number of code block groups of a transport block, and the information about the code block groups comprised in the currently scheduled transport block is a number of the code block groups comprised in the currently scheduled transport block; and
    wherein determining, by the terminal device, information about code block groups comprised in the currently scheduled transport block according to the first quantity information and the second quantity information, comprises:
    determining, by the terminal device, a number of the code blocks comprised in the currently scheduled transport block according to the second quantity information; and
    determining, by the terminal device, the number of the code block groups comprised in the currently scheduled transport block according to the maximum number of code block groups of a transport block and the number of the code blocks comprised in the transport block.

2. The method according to claim 1, wherein the first quantity information is used to indicate one of the following:
    a maximum number of code block groups of a transport block; and
    a number of the code block groups comprised in the currently scheduled transport block.

3. The method according to claim 1, wherein information carried by each code block group corresponds to one common cyclic redundancy check CRC information.

4. The method according to claim 1, wherein the information about code block groups comprised in the scheduled transport block comprises a number of the code block groups comprised in the scheduled transport block.

5. The method according to claim 1, wherein determining, by the terminal device, the number of the code block groups comprised in the currently scheduled transport block according to the maximum number of code block groups of a transport block and the number of the code blocks comprised in the transport block comprises:
    determining, by the terminal device, a smaller one of the maximum number of code block groups of a transport block and the number of the code blocks comprised in the currently scheduled transport block as the number of the code block groups comprised in the currently scheduled transport block.

6. The method according to claim 1, wherein when the terminal device determines that the number of the code block groups comprised in the currently scheduled transport block is the maximum number of code block groups of a transport block, the method further comprises:
    determining, by the terminal device, the number of code blocks comprised in each code block group according to the number of the code block groups comprised in the currently scheduled transport block and the number of code blocks comprised in the currently scheduled transport block.

7. The method according to claim 1, wherein when each of the code block groups comprises a plurality of code blocks, each block group consists of the plurality of code blocks with consecutive indices.

8. A terminal device, comprising a processor, a memory, and a transceiver, the processor, the memory, and the transceiver communicate with each other through an internal connection path, for transmitting control and/or data signals, such that the terminal device performs:
    determining, by the processor, first quantity information, wherein the first quantity information is information about a number of code block groups comprised in a transport block, and each code block group comprises at least a code block; and
    determining, by the processor, information about the code block groups comprised in the a currently scheduled transport block, according to the first quantity information and a second quantity information, wherein the second quantity information is information about a total number of bits comprised in the currently scheduled transport block;
    wherein the first quantity information is used to indicate a maximum number of code block groups of a transport block, and the information about the code block groups comprised in the currently scheduled transport block is the number of the code block groups comprised in the currently scheduled transport block; and
    wherein the processor is further configured to:
        determine the number of code blocks comprised in the currently scheduled transport block according to the second quantity information; and
        determine the number of code block groups comprised in the currently scheduled transport block according to the maximum number of code block groups of a transport block and the number of code blocks comprised in the transport block.

9. The terminal device according to claim 8, wherein the first quantity information is used to indicate one of the following:
   a maximum number of code block groups of a transport block; and
   a number of the code block groups comprised in the currently scheduled transport block.

10. The terminal device according to claim 8, wherein information carried by each code block group corresponds to one common cyclic redundancy check CRC information.

11. The terminal device according to claim 8, wherein the information about the code block groups comprised in the scheduled transport block is one of the following: comprises a number of code block groups comprised in the scheduled transport block.

12. The terminal device according to claim 8, wherein the processor is further configured to:
   determine a smaller one of the maximum number of code block groups of a transport block and the number of the code blocks comprised in the currently scheduled transport block as the number of the code block groups comprised in the currently scheduled transport block.

13. The terminal device according to claim 8, wherein when the processor determines that the number of the code block groups comprised in the currently scheduled transport block is the maximum number of code block groups of a transport block, the processor is also configured to:
   determine the number of code blocks comprised in each code block group, according to the number of code block groups comprised in the currently scheduled transport block, and the number of code blocks comprised in the currently scheduled transport block.

14. The terminal device according to claim 8, wherein the information about the code block groups comprised in the currently scheduled transport block is the number of code block groups comprised in the currently scheduled transport block, and the number of code blocks comprised in each code block group; and
   wherein the processor is further configured to:
   when the first quantity information is used to indicate the number of code block groups comprised in the currently scheduled transport block, determine the number indicated by the first quantity information as the number of code block groups comprised in the currently scheduled transport block; and
   determine the number of code blocks comprised in each code block group in the currently scheduled transport block according to the second quantity information.

15. The terminal device according to claim 14, wherein the processor is further configured to:
   determine the number of code blocks comprised in each code block group according to the second quantity information and the maximum number of bits of a code block.

16. The terminal device according to claim 15, wherein the terminal device supports a plurality of transmission configurations, wherein the transmission configurations comprise one of the following transmission configurations: a service type configuration, a transmission time interval configuration, and a basic parameter set configuration, and the processor is further configured to:
   determine, according to the current transmission configuration, a maximum number of bits of a code block.

17. The terminal device according to claim 8, wherein, when each of the code block groups comprises a plurality of code blocks, each block group consists of the plurality of code blocks with consecutive indices.

18. The terminal device according to claim 8, wherein information carried by each code block group corresponds to one common cyclic redundancy check CRC information, and information carried by each code block comprised in each code block group corresponds to one proprietary CRC information.

* * * * *